Patented Mar. 11, 1952

2,588,346

UNITED STATES PATENT OFFICE 2,588,346

REFINING GASOLINE AND PETROLEUM OILS WITH AQUEOUS ANTIMONY TRICHLORIDE

George R. Bond, Jr., Paulsboro, N. J., assignor to Houdry Process Corporation, Philadelphia, Pa., a corporation of Delaware No Drawing. Application October 22, 1949, Serial No. 123,101

9 Claims. (Cl. 196—44)

This invention relates to the treatment of hydrocarbon oils and particularly to improved processes of refining and purifying normally liquid petroleum distillates.

Liquid petroleum products obtained from crude oils by mere physical processes such as distillation or derived from thermally or catalytically cracked fractions of such oils, contain greater or less amounts of undesirable contaminants and usually require supplementary purification. Various types of chemical as well as physical treatments have been employed in the purification of these products, with greater or less success depending upon the composition of the product and the specific nature of the contaminants encountered. Certain types of chemical treatment which have heretofore been employed, although effective in removing by extraction or selective reaction particular kinds of contaminants, have been found to introduce other disadvantages including, for instance, attending losses or chemical modification of desirable constituents of the hydrocarbon fraction and/or impairment in quality of the product, such as reduced lead susceptibility or lowered octane ratings obtained in certain chemical treatments of gasoline fractions. The contaminants may be present in relatively small percentages and yet require exceedingly large quantities of chemical agents to effect their efficient removal, adding to the possibility of affecting the useful hydrocarbon constituents.

Among the contaminants chiefly encountered in naphtha fractions and particularly in gasoline and other fuels are: gum and resin forming substances, substances imparting or developing undesired discoloration with or without accompanying instability of the petroleum product, substances producing undesirable odors in the product, and substances having corrosive tendencies. Petroleum distillates and cracked fractions obtained from certain crude oils, chiefly those of high content of sulfur compounds, are characterized as being "sour," and must be "doctored" or otherwise "sweetened" to meet quality specifications.

I have found that antimony trichloride can be employed with beneficial advantage, in the purification of normally liquid hydrocarbon fractions, to replace or supplement other presently employed physical and chemical treating steps. In accordance with the present invention a normally liquid hydrocarbon fraction from petroleum is admixed with an aqueous solution of antimony trichloride, and the resulting aqueous phase containing transformed and extracted substances separated from the thus purified hydrocarbon fraction. The treated hydrocarbon fraction may, if desired, be subjected to further known purification or other treatment, but generally less extensive additional treatment with agents having adverse effects on the product will now be required, consequently minimizing the previous disadvantages of certain of these treatments. The antimony trichloride used in the purification step may be recovered from the separated aqueous phase in very simple manner, for instance by dilution with water to form antimony oxychloride as a precipitate, which is easily separated and can be readily washed and reconverted to antimony trichloride for reuse. The process can therefore be operated economically as a cyclic continuous operation.

The described refining treatment is applicable to normally liquid hydrocarbon fractions in general, but finds its more important applications in improving fractions employed as fuels as distinguished from heavier fractions finding their principal use as lubricants. Accordingly, the liquid hydrocarbon subjected to treatment may be a gasoline, kerosene, furnace oil, or a narrower or wider fraction in the naphtha range such as fractions or individual hydrocarbons employed as industrial solvents or for like purposes. The particular physical and chemical changes brought about by contacting contaminants in the impure hydrocarbon composition with the antimony trichloride solution cannot be fully explained, but it has been observed that the treated products are sweetened, being less susceptible to discoloration, substantially free from malodors, and that some of sulfur compounds present therein are removed or converted to a more innocuous form.

Although larger quantities of the treating solution, as in the order of 10% or more by volume of the oil, may be employed if desired without adverse effect, for practical and economic operation it is preferred to limit the same to the smallest quantities effective for the desired purpose, depending upon the relative degree of purity of the hydrocarbon liquid to be treated and the extent of purification desired. In most instances it will be found advantageous to repeat the treatment with the selected small quantity of treating solution, if necessary, rather than use large volumes in the initial treatment. It has been found that an amount of treating solution equivalent to about 0.2% of saturated aqueous antimony trichloride by volume of the liquid hydrocarbon, is generally satisfactory and in most instances lesser amounts of treating solution as down to about 0.1% by volume of the oil may be employed. Increased amounts of treating solution as up to about 5% or more by volume of the oil may sometime be preferred in practical operation if it is desired to limit the treatment to a single application of the treating solution.

The treatment can be readily performed by admixing the liquid hydrocarbon composition with the antimony trichloride solution at ordinary temperature such as at room temperature or below, and up to about 50–60° C. No advantage has been observed for the use of higher temperatures, but such higher temperatures may be employed, if desired, with possible reduction of contact time, so long as the boiling point of the treating solution or of the liquid hydrocarbon is not exceeded.

The time of contact required will of course depend upon the nature and activity of the contaminants to be reacted or otherwise affected, and to make certain that reaction has substantially fully taken place, it is preferred to permit the treating solution to remain in contact with the hydrocarbon composition for a period of about 30 minutes to about an hour.

Treatment of the hydrocarbon composition by other refining steps or with other chemical refining agents may precede or follow the described treatment with the antimony trichloride solution. For instance, if substances imparting disagreeable odors, still remain after the single or repeated treatment with the antimony trichloride, these may be due to simpler sulfur compounds which can be readily removed by a light dilute sulfuric acid wash, without the usual high treating losses and other disadvantages encountered when the known drastic concentrated sulfuric acid refining treatment is used alone.

On admixture of the antimony trichloride solution with the hydrocarbon liquid certain of the contaminants may be precipitated. Such precipitates are readily separated by filtration or decantation. A small part of the antimony trichloride will dissolve in the liquid hydrocarbon but can be easily removed by, for instance, washing with water and/or dilute acids preferably followed by neutralization with dilute alkaline solutions. After removal of any precipitate formed and the separation of the aqueous solution containing dissolved contaminants, the hydrocarbon liquid is preferably treated with water to convert dissolved antimony trichloride present therein to the oxychloride which forms a heavy white precipitate. After the chemical treatment and separation of precipitates, the treated liquid hydrocarbon may be further purified or fractionated by physical methods such as by distillation with or without steam.

Antimony trichloride may be recovered for reuse by dilution of the separated aqueous solution with water to precipitate the oxychloride and treatment of the precipitate with hydrochloric acid to reconvert the same to the soluble chloride.

Example I

The refining treatment was applied with good results to a sour gasoline fraction (450° F. end point) from a catalytically cracked California high sulfur crude stock, which fraction had an orange color.

(A) 50 parts of the above gasoline were admixed with 5 parts by volume of saturated antimony trichloride solution in water. A reddish precipitate formed on mixing. The treatment was continued for 30 minutes with moderate agitation by shaking. When the precipitate, which was chiefly concentrated on the walls of the reaction vessel, was separated, the gasoline lost its color and bad odor.

(B) On addition of water to the gasoline, a thick white precipitate characteristic of antimony oxychloride formed, which was removed by dissolution in hydrochloric acid. The gasoline was then further washed twice with small portions of concentrated hydrochloric acid (5 to 6% by volume of the gasoline), several times each with water (10% of volume) followed by 10% sodium hydroxide solution (5 to 6% diluted caustic by volume to gasoline). On steam distillation of the product 84% of the original volume of hydrocarbon was recovered as a colorless distillate having only the typical odor of a pure naphtha. The major portion of loss in volume was of less important light ends.

(C) The precipitate removed in step (A) above was shaken with concentrated hydrochloric acid, whereupon most of it was dissolved, leaving a residue with a mercaptan odor made up chiefly of a dark oil and a small amount of tar.

(D) The acid solutions from steps (B) and (C) were combined and diluted with water to precipitate antimony oxychloride which was permitted to settle, filtered off and rinsed with acetone, which dissolved out some additional tarry matter.

The treated gasoline remained perfectly colorless and developed no odor on long standing (in excess of several months).

The saturated $SbCl_3$ solution used in the treatments described in the above and following examples had a specific gravity of about 2.404 and represents a concentration of approximately 70.9% $SbCl_3$.

Example II (A) One part by volume of saturated antimony trichloride solution in water was added to 20 parts of crude benzol and shaken together over a period of 45 minutes. The product turned black.

(B) The black liquid was washed twice with small amounts of hydrochloric acid (about 0.1 part by volume) which removed part of the coloration, then washed with water and steam distilled. The distillate, amounting to about 89% by volume of the original benzol was clear, but not free from off-odor. The distillate was dried over calcium chloride and redistilled. The product now had only a trace of odor apparently due to carbon disulfide, which was readily removed by light treatment with sulfuric acid.

Example III

The gasoline treated in this experiment (420° F. end point) was derived from a year old crude distillate of a Southern California high sulfur stock, which gasoline had a deep orange color.

(A) The gasoline was admixed with 5% by volume of saturated antimony trichloride solution. An orange precipitate formed. The mixture was shaken during an hour and then let stand for about the same time, then chilled in ice water. The liquid decanted readily from the precipitate and traces of precipitate remaining were removed by subsequent filtration. The volume of gasoline was now about 95.5% of the original.

(B) The recovered gasoline was then extracted four times with small portions of concentrated hydrochloric acid (about 2% of the volume) and water washed. During the acid treatment the orange coloration changed to blue and then became yellow on water treatment. The product was additionally washed with 6N sodium carbonate solution and again with water, then distilled to 210° F., the remainder was steam distilled. The combined distillates were colorless. The dark phenolic residue constituted no more than about 1% by volume of the original liquid subjected to distillation.

Example IV

A sample of gasoline from a Richfield, California refinery was selected for treatment because of its poor color (dark red), unpleasant odor, and other undesirable characteristics. This material was violently agitated in the presence of 0.2% by volume of a saturated aqueous $SbCl_3$ solution. A heavy black sludge formed immediately, which was allowed to settle out overnight. The clear light yellow gasoline was decanted from the sludge and subjected to water washing (3 times), treated with small amount of dilute hydrochloric acid (about 0.01 part by volume) again water washed, then with about 0.03 part by volume of 5% aqueous solution of $Na_2CO_3$ and finally washed twice with water. The gasoline was then dried over calcium chloride and distilled.

The recovered gasoline (about 99.4% of original volume) after the preceding treatment, was subject to distillation and 96.5% thereof boiling below 415° F. was recovered. There was approximately 3% bottoms having dark brown color. The distillate had a pale straw color and a clean sweet odor. The sample tested satisfactorily for color stability and exposure to light.

The sludge from the $SbCl_3$ treatment was subjected to analysis and the following approximate quantities of materials were identified and obtained:

|  | Per cent weight of orig. gaso. | Per cent vol. of orig. gaso. |
| --- | --- | --- |
| Phenols | 0.04 |  |
| Volatile N bases |  | 0.22 |
| Pyridine type compounds | 0.02 |  |
| Non-volatile N bases | 0.009 |  |
| Tars, etc | 0.02 |  |

Example V

A sample of fuel oil, approximately #2 grade, comprising catalytic cycle stock from the processing of Michigan crude was selected for treatment with $SbCl_3$ in view of its poor color stability, and bad sludging characteristics. The usual color requirement of this type of oil is approximately 2½ to 2¾ NPA. The fuel oil before treatment had a color of 5, and a hot test of 9 hours.

This fuel oil was treated with 1% by volume of a saturated aqueous $SbCl_3$ solution by vigorous shaking. Formation of considerable sludge of very dark color was noticed. The material was filtered and the filtrate water washed and treated with dilute sodium hydroxide solution to precipitate excess antimony compounds which were subsequently removed by filtration. The thus purified oil after further water washing and drying now had a color of 2¼ NPA, and the hot stability was increased to 12 hours. The color stability on exposure to light was also satisfactory.

The "hot test" above referred to is an accelerated storage stability test and is carried out by holding the oil at 110° C. for a number of hours for development of color and/or sludge.

Obviously many modifications and variations of the invention as hereinbefore set forth may be made without departing from the spirit and scope thereof and therefore only such limitations should be imposed as are indicated in the appended claims.

The present application is a continuation in part of application Serial No. 749,341, filed May 20, 1947, now abandoned.

I claim as my invention:

1. The method of refining normally liquid petroleum hydrocarbon fractions which comprises treating such a fraction with an aqueous solution of antimony trichloride, said aqueous solution being employed in an amount at least equivalent to about 0.1% saturated antimony trichloride solution per volume of liquid hydrocarbon fraction treated.

2. A cyclic process for removing undesirable contaminants from gasoline and naphtha fractions which comprises treating such a fraction with an aqueous solution of antimony trichloride, said aqueous solution containing an amount of antimony trichloride equivalent to at least 0.1% saturated aqueous solution of antimony trichloride per volume of said fraction, separating an aqueous phase containing undesired contaminants from said fraction, precipitating antimony oxychloride by further dilution of the aqueous phase, separating and purifying the obtained precipitate and reconverting the antimony oxychloride to soluble antimony trichloride for further use in the process.

3. The process in accordance with claim 2 in which the conversion of oxychloride to soluble chloride is effected by treatment of the precipitate with hydrochloric acid.

4. The method of refining liquid petroleum hydrocarbon fractions below the boiling range of lubricants which comprises treating such a hydrocarbon fraction with a saturated aqueous solution of antimony trichloride at a temperature below about 60° C. for a period of not less than about one-half hour, separating the aqueous phase formed including extracted contaminants therein, and lightly washing the hydrocarbon fraction with dilute mineral acid.

5. The method of refining a sour gasoline which comprises treating the said gasoline with 0.2% to 10% by volume of a saturated aqueous solution of antimony trichloride, separating the obtained precipitate, removing the antimony trichloride from the treated gasoline by steps including treating the gasoline with water to precipitate antimony oxychloride.

6. The method of purifying gasoline derived from a high sulfur petroleum stock which comprises treating such gasoline with an aqueous solution of antimony trichloride, removing formed precipitates, acid washing the resulting liquid, neutralizing the acid washed liquid and distilling the same to recover purified gasoline.

7. The method of refining liquid petroleum hydrocarbon distillates boiling in the range of gasoline and naphthas which comprises treating such a distillate with an aqueous solution of antimony trichloride to precipitate contaminants from the distillate and removing the precipitate thus formed.

8. The method of refining normally liquid petroleum hydrocarbon distillates in the fuel oil boiling range which comprises treating such a distillate with an aqueous solution of antimony trichloride to precipitate contaminants from the distillate and removing the precipitate thus formed.

9. The method of refining furnace oil which comprises treating said oil with about 1% by volume of a saturated aqueous solution of antimony trichloride, separating the obtained precipitate, removing the antimony trichloride from the treated oil by steps including treating the oil with water to precipitate antimony oxychloride.

GEORGE R. BOND, JR.

REFERENCES CITED

The following references are of record in the file of this patent:

UNITED STATES PATENTS

| Number | Name | Date |
| --- | --- | --- |
| 1,823,558 | Burke | Sept. 15, 1931 |
| 2,339,786 | Larsen | Jan. 25, 1944 |
| 2,493,596 | Reman | Jan. 3, 1950 |